United States Patent [19]

Schönhut

[11] Patent Number: 4,500,179

[45] Date of Patent: Feb. 19, 1985

[54] SIDE BRIDGE FOR METAL SPECTACLES

[75] Inventor: Kurt Schönhut, Schwaebisch Gmuend-Unterbettringen, Fed. Rep. of Germany

[73] Assignee: Firma Ferdinand Menrad, Schwabisch-Gmund-Bettringen, Fed. Rep. of Germany

[21] Appl. No.: 388,644

[22] Filed: Jun. 15, 1982

[30] Foreign Application Priority Data

Jun. 16, 1981 [DE] Fed. Rep. of Germany ....... 3123925

[51] Int. Cl.³ .......................... G02C 1/00; G02C 5/12
[52] U.S. Cl. ..................................... 351/137; 351/76
[58] Field of Search ..................... 351/76, 78, 80, 118, 351/128, 137, 138

[56] References Cited

FOREIGN PATENT DOCUMENTS 1358532 3/1964 France ................................ 351/118
1401735 4/1965 France ................................ 351/137

Primary Examiner—Rodney B. Bovernick
Attorney, Agent, or Firm—Collard, Roe & Galgano

[57] ABSTRACT

A side bridge for metal spectacles has a plastic pad and a metallic bridge support which is insertable with one connecting end into an opening of a mounting support provided on the pad. The mounting support is made of a spring elastic material. In the opening and at the connecting end, lockable profiles or elements are provided. The profiles mounted on the mounting support are preferably provided in the center of the opening which serves as a passageway opening. The opposite side faces of the opening diverge in the direction of the discharge openings thereof.

1 Claim, 2 Drawing Figures

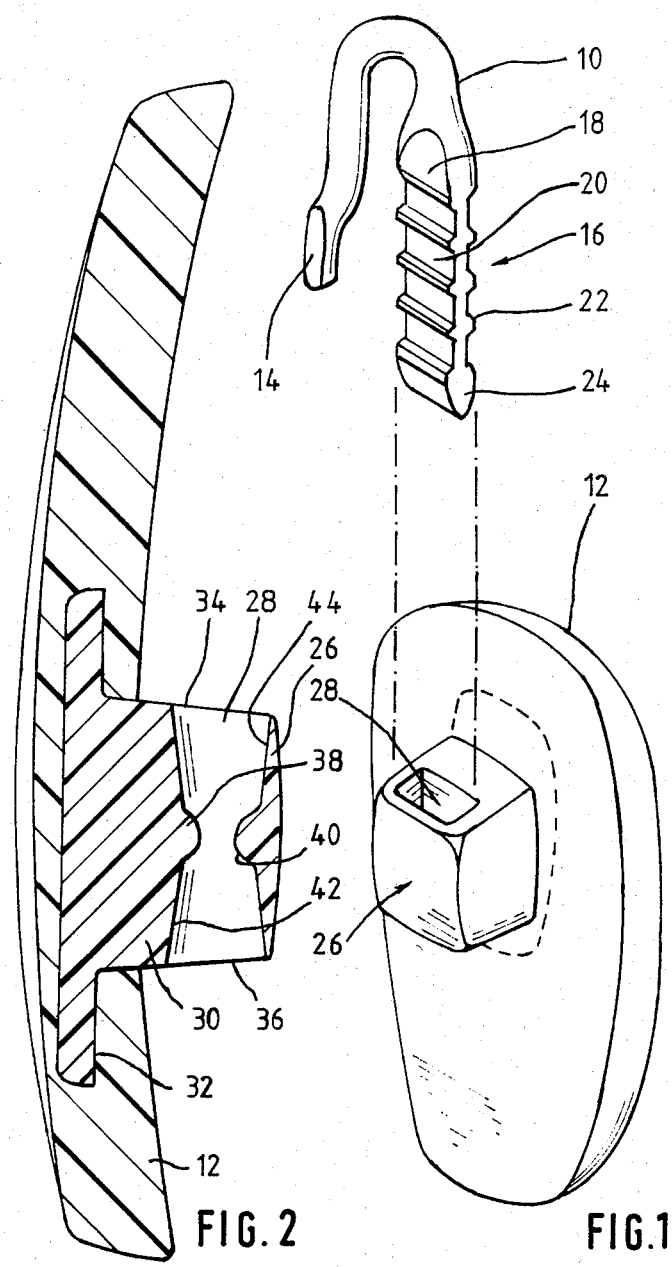

SIDE BRIDGE FOR METAL SPECTACLES

The invention relates to a side bridge for metal spectacles. More particularly, it relates to such a side bridge having a plastic pad and a metallic bridge support, the latter of which has an end which is insertable into an opening of a mounting support provided on the pad, and wherein positive locking elements are brought into engagement with each other within the opening and at the end which are suitable for arresting movement of the bridge support relative to the mounting support, at least against the insert sliding direction.

A side bridge of this type is known from DE-Gbm 74 28 158, wherein an eccentric bolt is rotatably mounted in the opening of the mounting support which can be brought into and out of contact with one of a plurality of transverse grooves, provided at the connecting end of the bridge support by means of turning. The structure is relatively expensive due to the eccentric bolt. Furthermore the problem exists that the bolt can become loose and get lost.

Side bridges are also known which are mounted by means of screws. However, here too, the structure is also very expensive and the danger exists that the screws can become loose and drop out.

In a further known modification a metal part is molded into the pad which can be inserted into a slotted and grooved mounting. After positioning of the metal part in the mounting, a sleeve is pushed over it, so as to maintain the mounting in its closed metal part retaining position. This structure is known from DE-Gbm 1 965 985.

In the so-called clip-in-pad, a metal cage is provided which is designed as a spring part. This permits a swinging movement for the pad, but it otherwise retains it in its mounting.

In the latter mentioned structures, metal parts are present which are provided with cutting faces which causes corrosion in these structures, because the rolled material no longer has a gold layer on the cutting faces and an after galvanizing cannot compensate for the quality loss. Furthermore, the clip-in-pad does not permit a height adjustment. The metal parts which are molded into the pad, which are preferably made in the injection molding process, can corrode. When the clip-in pad is not properly handled, for example, a slight stretching of the spring element, irreparable damage may occur. Furthermore, the structures are very expensive due to the number of required parts.

It is therefore an object of the invention to design a side rib of the aforementioned type in such a manner that an economical, corrosion-proof structure is provided with the least possible number of individual parts, wherein no parts are present which can get lost, and wherein the damage danger due to improper handling is very low.

The solution of this object of the invention is obtained by the provision of a side bridge of the aforementioned type having a mounting support which consists of a spring elastic material and wherein lockable profiles are provided in the opening of the mounting support and at the connecting end of the metallic bridge support.

In such a structure the eccentric bolt can be eliminated, thereby forestalling the possibility of the side rib becoming unuseable due to the loss of this bolt. The nonexistence of the cutting edges on the support bridge allows it to be made corrosion resistant from one piece and from rolled gold. The pad consists completely of plastic.

Preferably, the connecting end and/or the opening are provided with a plurality of successive profiles in the insertion direction, whereby in a simple manner a height adjustment of the pad with respect to the bridge support is made possible in a simple manner.

The invention will be explained in more detail in conjunction with an exemplified embodiment of the invention illustrated in the drawing. In the drawing:

FIG. 1 is a perspective view of the bridge support and the pad embodying the present invention before assembly and FIG. 2 is a sectional view through an embodiment of the pad with a molded mounting support.

Referring now in detail to the drawing, the inventive side bridge consists of a bridge support 10, preferably made of rolled gold and a pad 12 made of a plastic or synthetic resin material.

The bridge support 10 is U-shaped and is provided at one end with a flat soldering face 14 which serves for connecting the support to the rim of edge of the lens or spectacle glass of the spectacle frame (not shown). The shank of the U-shaped structure which represents the other end of the bridge support 10 is pressed into a longitudinally-extending rectangular plate representing a connecting end 16 whose oppositely flat surfaces 18 are provided with grooves 20 which extend transversely with respect to the longitudinal direction of this shank, and between which ribs 22 extend. The free end 24 of the connecting end 16 is bevelled parallel to ribs 22.

The pad 12 is provided with a mounting support 26 for the bridge support 10, whereby the mounting support is molded unitarily with pad 12 or may be molded as a separated structural element into pad 12, as is the case in the illustrated exemplified embodiment. This is advantageous in that the mounting support 26 can be made from a relatively hard plastic material with a high spring-back resiliency, while the pad 12 may consist of a soft pliable material, so that a fasile mounting of the pad is obtained, on the one hand, while the elasticity of the mounting support can be designed corresponding to the intended locking connection with the bridge support 10, on the other hand.

The mounting support 26 consists of a block 30 provided with an opening 28 and a plate 32 tip stretched on block 30 which is injection molded into pad 12.

Opening 28 is designed as the passageway or throughput opening, in the center of which between the two discharge openings 34 and 36 thereof at two opposite, almost parallel side faces of opening 28 opposite to the supporting face of pad 12, two rib like projections 38 and 40 are provided disposed transversely with respect to the passageway direction of opening 28. From these projections 38 and 40, the side faces 42 or 44 diverge up to the discharge openings 34 or 36, so that the bevelled end 24 of connecting end 16 of the bridge support 10 can be easily inserted into opening 28, thereby spreading the side faces 42 and 44 elastically apart until the projections 38 and 40 engage into groove 20 trailing the bevelled end 24. When the bridge support 10 is inserted further into opening 28, the projections 38 and 40 can engage into one of the following grooves 20, so as to determine the height position of pad 12 of bridge support 10, depending on the desired requirements.

In view of the diverging side faces 42 and 44 which diverge in the direction of discharge openings 34 and 36, pad 12 affords the possibility to adjust itself and at an axis which in parallel to the projections 38 and 40, without changing the vertical position on the bridge support 10.

The surface of plate 12 facing away from block 30 may be provided with a profile or marking, for example, a company name which remains visible when block 30 is imbedded into a pad 12 made of transparent material.

I claim:

1. A side bridge for metal spectacles comprising:
  a plastic pad formed of synthetic resin;
  a mounting support formed of resilient material having a longitudinal opening therein and an axis substantially parallel to said pad;
  at least one locking projection extending generally transversely into said opening with respect to the longitudinal axis thereof, said at least one locking projection being disposed generally centrally in said opening and said opening flaring outwardly on each side of said at least one locking projection;
  a metallic bridge support having one end which is insertable axially into said opening of said mounting support; and
  a plurality of successive ridges on said one end of said bridge support disposed transversely with respect to said axis of said opening;
  said at least one locking projection in said opening of said mounting support being engageable with each of said successive ridges and the outward flare of said opening in said mounting support on each side of said at least one locking projection permitting pivotal movement of said pad about the engagement of said at least one locking projection with one of said ridges substantially in the plane defined by said axis of said opening and transverse to said ridges and said at least one locking projection.

* * * * *